(12) United States Patent
Pantuso et al.

(10) Patent No.: US 7,681,208 B1
(45) Date of Patent: *Mar. 16, 2010

(54) EXTRACTOR SYSTEM, METHOD AND COMPUTER PROGRAM PRODUCT FOR MANAGING NETWORK ACCESS ON A PER-APPLICATION BASIS

(75) Inventors: Joseph J. Pantuso, Springboro, OH (US); Ryan L. Schneider, Miamisburg, OH (US)

(73) Assignee: McAfee, Inc., Santa Clara, CA (US)

( * ) Notice: Subject to any disclaimer, the term of this patent is extended or adjusted under 35 U.S.C. 154(b) by 138 days.

This patent is subject to a terminal disclaimer.

(21) Appl. No.: 11/854,426

(22) Filed: Sep. 12, 2007

Related U.S. Application Data

(63) Continuation of application No. 10/071,587, filed on Feb. 8, 2002, now Pat. No. 7,383,556.

(51) Int. Cl.
*G06F 3/001* (2006.01)
(52) U.S. Cl. .................................................. 719/328
(58) Field of Classification Search .................. 719/328
See application file for complete search history.

(56) References Cited

U.S. PATENT DOCUMENTS

| | | | | |
|---|---|---|---|---|
| 5,473,777 | A | * | 12/1995 | Moeller et al. ............... 719/328 |
| 5,568,487 | A | | 10/1996 | Sitbon et al. ................. 370/466 |
| 5,812,768 | A | | 9/1998 | Page et al. .................... 709/228 |
| 5,987,611 | A | | 11/1999 | Freund ......................... 713/201 |
| 6,651,186 | B1 | * | 11/2003 | Schwabe ...................... 714/38 |
| 6,748,343 | B2 | * | 6/2004 | Alexander et al. ........... 702/188 |
| 6,874,149 | B1 | * | 3/2005 | Bermudez et al. ........... 719/328 |
| 7,383,556 | B1 | | 6/2008 | Pantuso et al. ............... 719/328 |
| 2003/0135465 | A1 | * | 7/2003 | Lee et al. ...................... 705/51 |
| 2004/0133478 | A1 | | 7/2004 | Leahy et al. .................. 705/26 |

OTHER PUBLICATIONS

Michael Norton, Basics of Network Segmentation: Switching and Bridging, Mar. 16, 2001.
OPT, Optimizations, Mar. 22, 2000.
"ZoneAlarm Pro, Advanced Internet Security and Peace of Mind," Zone Labs, Inc., 2001.
"Zone Labs Integrity, Enterprise Endpoint Security," Zone Labs Inc., 2001.
"McAfee Firewall 3.0 State-of-the-art defense against hackers and other online intruders," mcafee-at-home.com/products/firewall/default.asp?m—2, 2001.
"McAfee Firewall 3.0," McAfee, 2001.
Office Action Summary from U.S. Appl. No. 10/071,587 mailed on Nov. 18, 2004.

(Continued)

*Primary Examiner*—Lechi Truong
(74) *Attorney, Agent, or Firm*—Zilka-Kotab, PC

(57) ABSTRACT

A system, method and computer program product are provided for management of network access on a per application basis. Initially, applications are selected from a group of applications adapted for working in conjunction with a first application program interface to gain access to a network. Next, a second application program interface is utilized which is adapted for precluding all of the applications from accessing the network. In use, the selected applications are wrapped for allowing such applications to access the network via the second application program interface.

10 Claims, 6 Drawing Sheets

OTHER PUBLICATIONS

Final Office Action Summary from U.S. Appl. No. 10/071,587 mailed on Feb. 16, 2005.
Copy of Advisory Action from U.S. Application No. 10/071,587 mailed on Jun. 17, 2005.
Office Action Summary from U.S. Appl. No. 10/071,587 mailed on Oct. 4, 2005.
Office Action Summary from U.S. Appl. No. 10/071,587 mailed on Dec. 13, 2006.
Office Action Summary from U.S. Appl. No. 10/071,587 mailed on Aug. 22, 2007.
Notice of Allowance from U.S. Appl. No. 10/071,587 mailed on Mar. 11, 2008.

* cited by examiner

EXTRACTOR SYSTEM, METHOD AND COMPUTER PROGRAM PRODUCT FOR MANAGING NETWORK ACCESS ON A PER-APPLICATION BASIS

RELATED APPLICATIONS

The present application is a continuation of application Ser. No. 10/071,587, filed on Feb. 8, 2002, now U.S. Pat. No. 7,383,556, filed on Feb. 8, 2002, which is incorporated herein by reference.

FIELD OF THE INVENTION

The present invention relates to firewalls, and more particularly to restricting access to a network on a per-application basis.

BACKGROUND OF THE INVENTION

In the space of just a few years, the Internet—because it provides access to information, and the ability to publish information, in revolutionary ways—has emerged from relative obscurity to international prominence. Whereas in general an inlernet is a network of networks, the Internet is a global collection of interconnected local, mid-level, and wide-area networks that use the Internet Protocol (IP) as the network layer protocol. Whereas the Internet embraces many local- and wide-area networks, a given local- or wide-area network may or may not form part of the Internet.

As the Internet and its underlying technologies have become increasingly familiar, attention has become focused on Internet security and computer network security in general. With unprecedented access to information has also come unprecedented opportunities to gain unauthorized access to data, change data, destroy data, make unauthorized use of computer resources, interfere with the intended use of computer resources, etc. As experience has shown, the frontier of cyberspace has its share of scofflaws, resulting in increased efforts to protect the data, resources, and reputations of those embracing intranets and the Internet.

Firewalls are intended to shield data and resources from the potential ravages of computer network intruders. In essence, a firewall functions as a mechanism which monitors and controls the flow of data between two networks, or a network and a device. All communications, e.g., data packets, which flow between the networks in either direction must pass through the firewall; otherwise, security is circumvented. The firewall selectively permits the communications to pass from one network to another network or device, to provide bidirectional security.

Recently, there has been much work on software applications referred to as "personal firewalls." These applications are typically installed on a computer or any other computing device for protecting against unsecure networks coupled thereto. During use of such personal firewalls, network traffic is monitored and filtered based on a predetermined set of rules. Such rules may include any filtering criteria that protect the device. For example, such criteria may result in the prevention of computers having certain IP addresses from accessing the protected device, precluding access to certain ports associated with the protected device, the prevention of certain applications accessing the protected device, etc.

Various system and methods have been developed to accomplish the task of preventing certain applications from accessing a network. For example, U.S. Pat. No. 5,987,611 discloses a computing environment with methods for monitoring access to an open network, such as a WAN or the Internet. The system includes one or more clients, each operating applications or processes (e.g., Netscape Navigator®. or Microsoft Internet Explorer® browser software) requiring Internet (or other open network) access (e.g., an Internet connection to one or more Web servers). Client-based monitoring and filtering of access is provided in conjunction with a centralized enforcement supervisor.

The supervisor maintains access rules for the client-based filtering and verifies the existence and proper operation of the client-based filter application. Access rules which can be defined can specify criteria such as total time a user can be connected to the Internet (e.g., per day, week, month, or the like), time a user can interactively use the Internet (e.g., per day, week, month, or the like), a list of applications or application versions that a user can or cannot use in order to access the Internet, a list of URLs (or WAN addresses) that a user application can (or cannot) access, a list of protocols or protocol components (such as Java Script®) that a user application can or cannot use, and rules to determine what events should be logged (including how long are logs to be kept).

By intercepting process loading and unloading and keeping a list of currently-active processes, each client process can be checked for various characteristics, including checking executable names, version numbers, executable file checksums, version header details, configuration settings, and the like. With this information, the system can determine if a particular process in question should have access to the Internet and what kind of access (i.e., protocols, Internet addresses, time limitations, and the like) is permissible for the given specific user.

Unfortunately, systems such as that set forth in U.S. Pat. No. 5,987,611 require an additional software layer between the operating system and the network device in order to govern network access.

Prior Art FIG. 1A illustrates one exemplary positioning of such a software layer. As shown, a software stack 10 is positioned between a plurality of applications 12 and a network device 14 such as network card, interface, etc.

Normally, such software stack 10 includes an operating system layer 16, a network driver interface specification (NDIS) layer 18, and an Internet Protocol (IP) layer 20. Systems such as that set forth in U.S. Pat. No. 5,987,611 require an additional software layer 22 to intercept network access requests made by various applications.

DISCLOSURE OF THE INVENTION

A system, method and computer program product are provided for management of network access on a per application basis. Initially, applications are selected from a group of applications adapted for working in conjunction with a first application program interface to gain access to a network. Next, a second application program interface is utilized which is adapted for precluding all of the applications from accessing the network.

In use, the selected applications are wrapped for allowing such applications to access the network via the second application program interface.

In one embodiment, the selected applications may be wrapped with a wrapper adapted for compressing data in a portable executable (PE) image. Further, the wrapper may equip the compressed data with extractor code adapted for extracting the data in the PE image. Such extractor code may further be adapted for interfacing with the second application program interface.

In another embodiment, the extractor code may be further adapted for identifying a location in memory. Such location in memory may be where a routine is stored for allowing the selected applications to access the network.

Still yet, a user may be permitted to select the applications to be allowed to access the network via the second application program interface.

To accomplish this, a data structure may be stored in memory for management of network access on a per application basis. Such data structure may include an application program interface object for precluding a plurality of applications from accessing a network. Further, a wrapper object may be provided for wrapping selected applications for allowing the selected applications to access the network via the application program interface object.

DESCRIPTION OF THE PREFERRED EMBODIMENTS

Figure 1A:
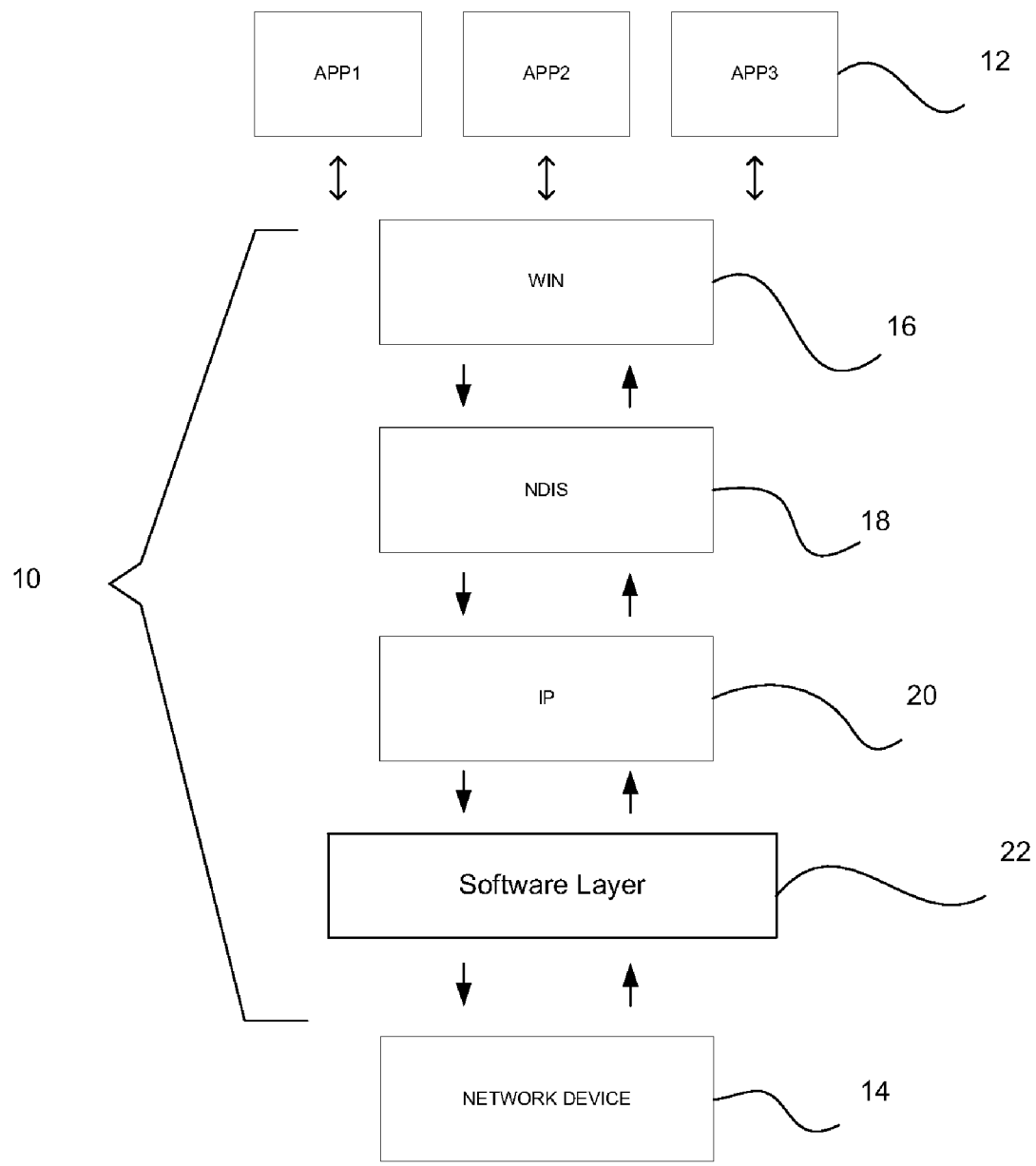
FIG. 1A illustrates the prior art.
Figure 1B:
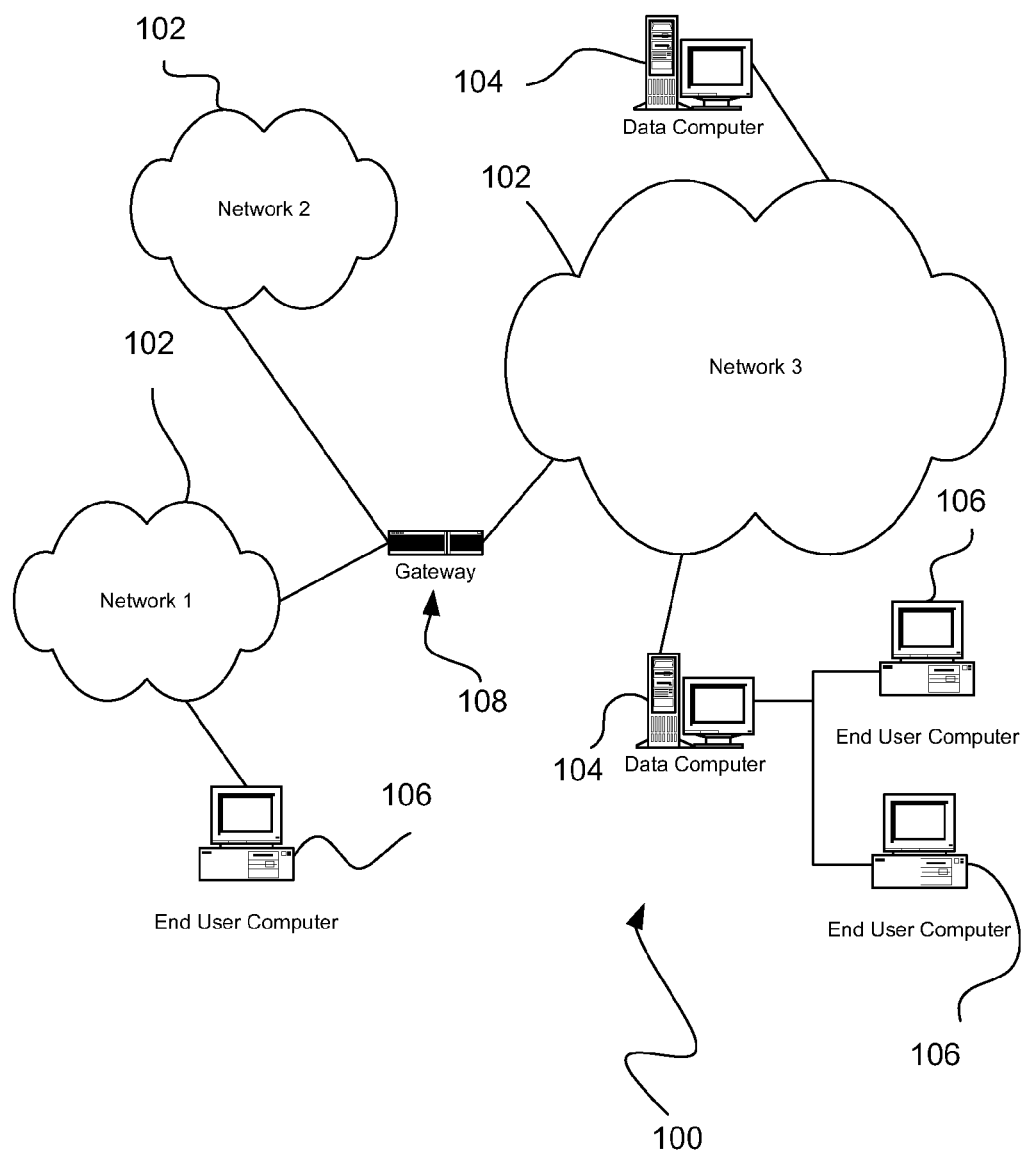
FIG. 1B illustrates an exemplary network environment, in accordance with one embodiment.

FIG. 1B illustrates a network architecture 100, in accordance with one embodiment. As shown, a plurality of networks 102 is provided. In the context of the present network architecture 100, the networks 102 may each take any form including, but not limited to a local area network (LAN), a wide area network (WAN) such as the Internet, etc.

Coupled to the networks 102 are data computers 104 which are capable of communicating over the networks 102. Also coupled to the networks 102 and the data computers 104 is a plurality of end user computers 106. In the context of the present description, such end user computers 106 may include a web server, desktop computer, laptop computer, hand-held computer, printer or any other type of hardware/software network device. More detail regarding an exemplary embodiment of such data computers 104 and user computers 106 will be set forth hereinafter during reference to FIG. 2. A gateway 108 may optionally be coupled between the various computers.

Figure 2:
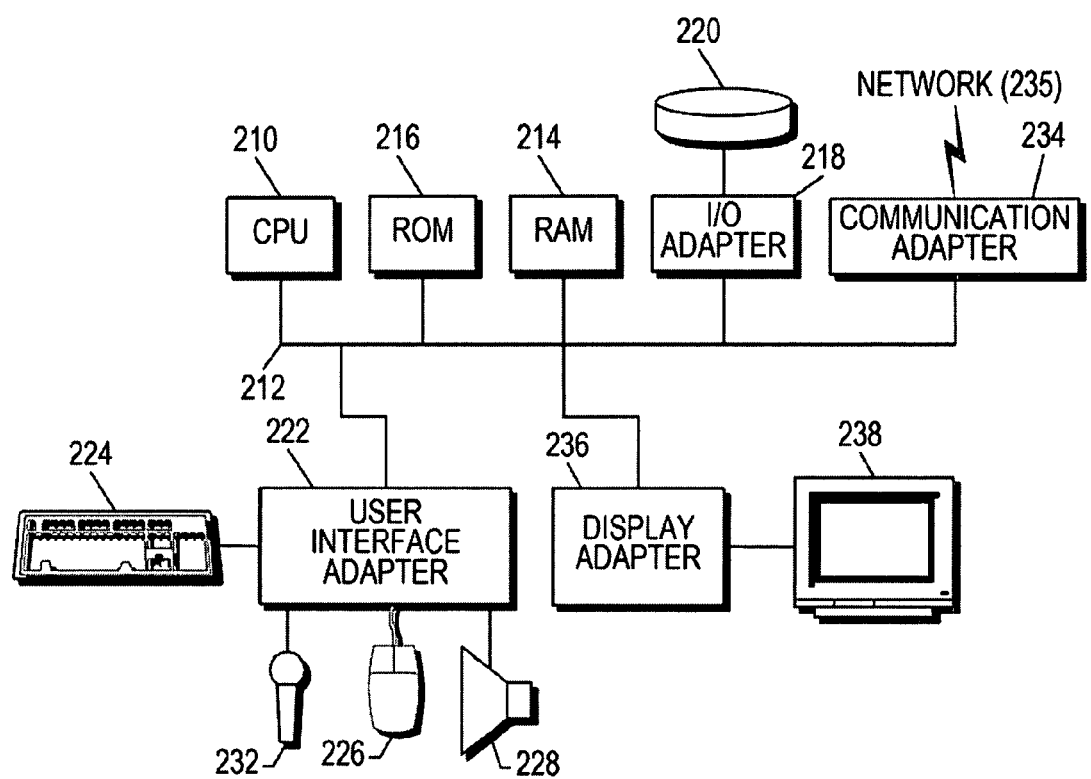
FIG. 2 shows a representative hardware environment associated with the computers of FIG. 1B.

FIG. 2 shows a representative hardware environment that may be associated with the data computers 104 and/or end user computers 106 of FIG. 1B, in accordance with one embodiment. Such figure illustrates a typical hardware configuration of a workstation in accordance with a preferred embodiment having a central processing unit 210, such as a microprocessor, and a number of other units interconnected via a system bus 212.

The workstation shown in FIG. 2 includes a Random Access Memory (RAM) 214, Read Only Memory (ROM) 216, an I/O adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen (not shown) to the bus 212, communication adapter 234 for connecting the workstation to a communication network 235 (e.g., a data processing network) and a display adapter 236 for connecting the bus 212 to a display device 238.

The workstation may have resident thereon an operating system such as the Microsoft Windows NT or Windows/95 Operating System (OS), the IBM OS/2 operating system, the MAC OS, or UNIX operating system. It will be appreciated that a preferred embodiment may also be implemented on platforms and operating systems other than those mentioned. A preferred embodiment may be written using JAVA, C, and/or C++ language, or other programming languages, along with an object oriented programming methodology. Object oriented programming (OOP) has become increasingly used to develop complex applications.

Figure 3:
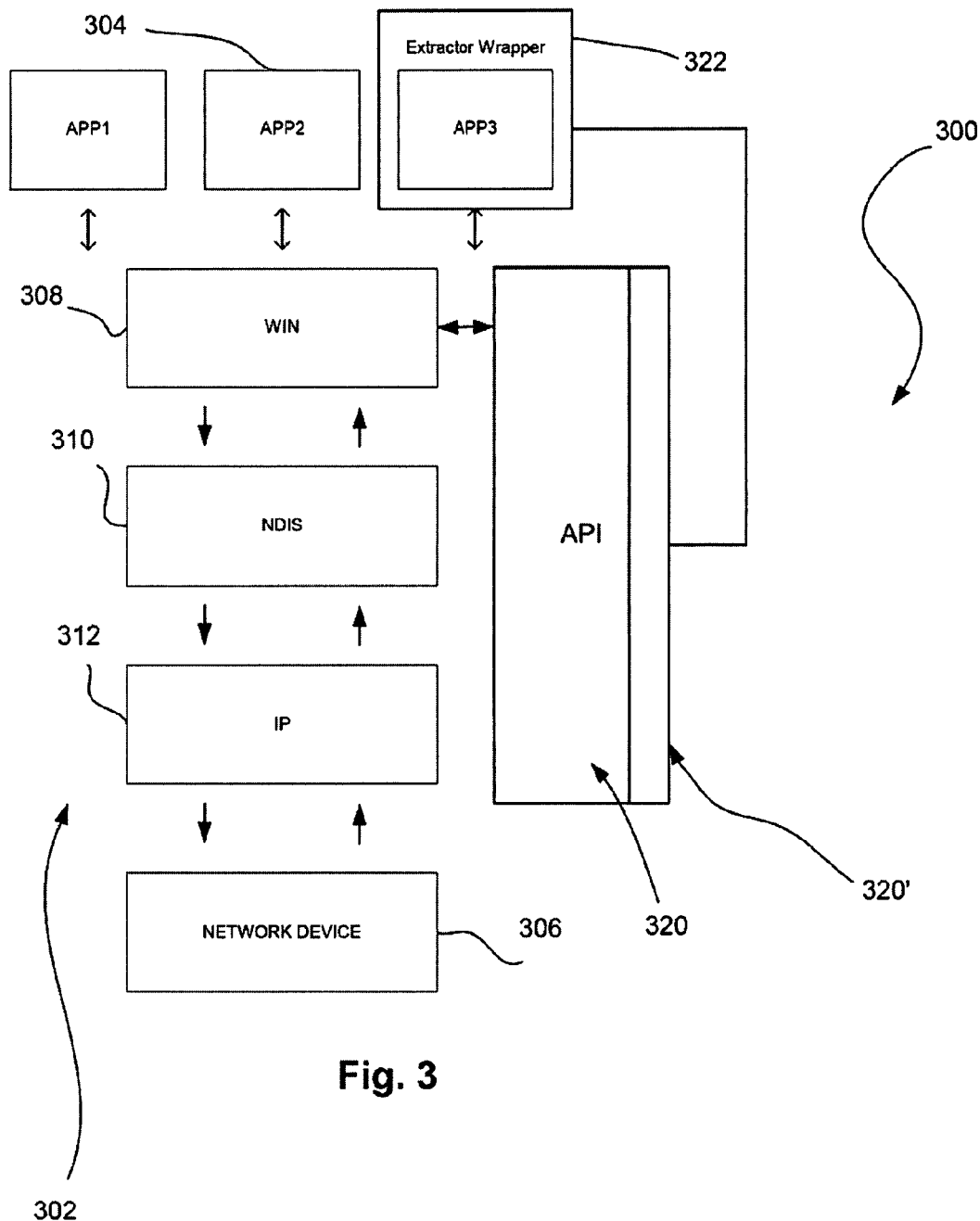
FIG. 3 illustrates a framework that may be implemented on the architecture shown in FIG. 2.

FIG. 3 illustrates a framework 300 that may be implemented on the architecture shown in FIG. 2. Of course, the framework 300 may be implemented in any desired environment.

As shown, a software stack 302 is positioned between a plurality of applications 304 and a network device 306. In the context of the present invention, each of such applications may refer to any program designed to perform a specific function directly for the user or, in some cases, for another application program, etc. Examples of application programs may include, but are not limited to word processors; database programs; Web browsers; development tools; drawing, paint, and image editing programs; and communication programs. Further, the network device may include a network card, and/or any other type of device capable of interfacing a network.

Similar to the prior art, the software stack 302 includes an operating system layer 308, a network driver interface specification (NDIS) layer 310, and an Internet Protocol (IP) layer 312. Such layers operate in a conventional manner to afford communication between the applications 304 and the network device 306, as well as various other functionality. For example, the NDIS layer 310 refers to a standard that defines an interface for communication between the MAC sublayer and the protocol drivers, which offers protocol multiplexing so that multiple protocol stacks can be used at the same time.

Further provided is an application program interface (API) 320. Such API 320 is associated with the operating system layer 308 and includes a specific method prescribed by a computer operating system 308 or by an application 304 by which a programmer writing an application 304 can make requests of the operating system 308 or another application 304.

Traditionally, such API 320 identifies a plurality of addresses that correlate which prescribed routines are stored in memory. These routines are adapted for being called by the applications 304, and receiving and carrying out requests relating to accessing a network via the network device 306. Often, such routines reside in a standard place in memory, and the API 320 is equipped with such locations for carrying out the task of network communications. In the context of the present description, standard computers are equipped with a first API that is adapted to operate in this manner.

In one embodiment, a second API 320' is also provided for altering the aforementioned framework for purposes that will soon become apparent. In particular, the second API 320' is adapted for requiring applications to call a different location in memory in order execute the aforementioned routines. In other words, upon the installation of the second API 320'

(without any further modifications to the system), the applications are unable to access the routines necessary to access a network.

In the context of the present description, the second API 320' may include a copy of the first API 320 which is subsequently modified by an installation program or the like, or a completely separate API which leaves the first API unused. Of course, the second API 320' may take any form that is capable of providing the functionality set forth herein.

Further provided is a plurality of wrappers 322 which are each associated with one of the applications. For reasons that will soon become apparent, only those applications 304 that are to be able to access the network are equipped with such wrappers 322. Of course, these applications 304 may be selected in any desired manner such as via a user, a administrator, automatically, or in any other desired manner.

In use, such wrappers 322 may reroute the requests made by the associated applications 304 to use the second API 320' to access the aforementioned routines in the appropriate locations in memory. To this end, only those selected applications 304 that equipped with the wrappers 322 are capable of accessing the network via the network device 306. More information regarding one exemplary embodiment of how such wrapper 322 may work will be set forth during reference to FIG. 4.

In summary, a data structure is provided for management of network access on a per application basis. Such data structure may include an application program interface object for precluding a plurality of "as-is" applications from accessing a network. Further, a wrapper object may be provided for wrapping selected applications for allowing the selected applications to access the network via the application program interface object.

Figure 4:
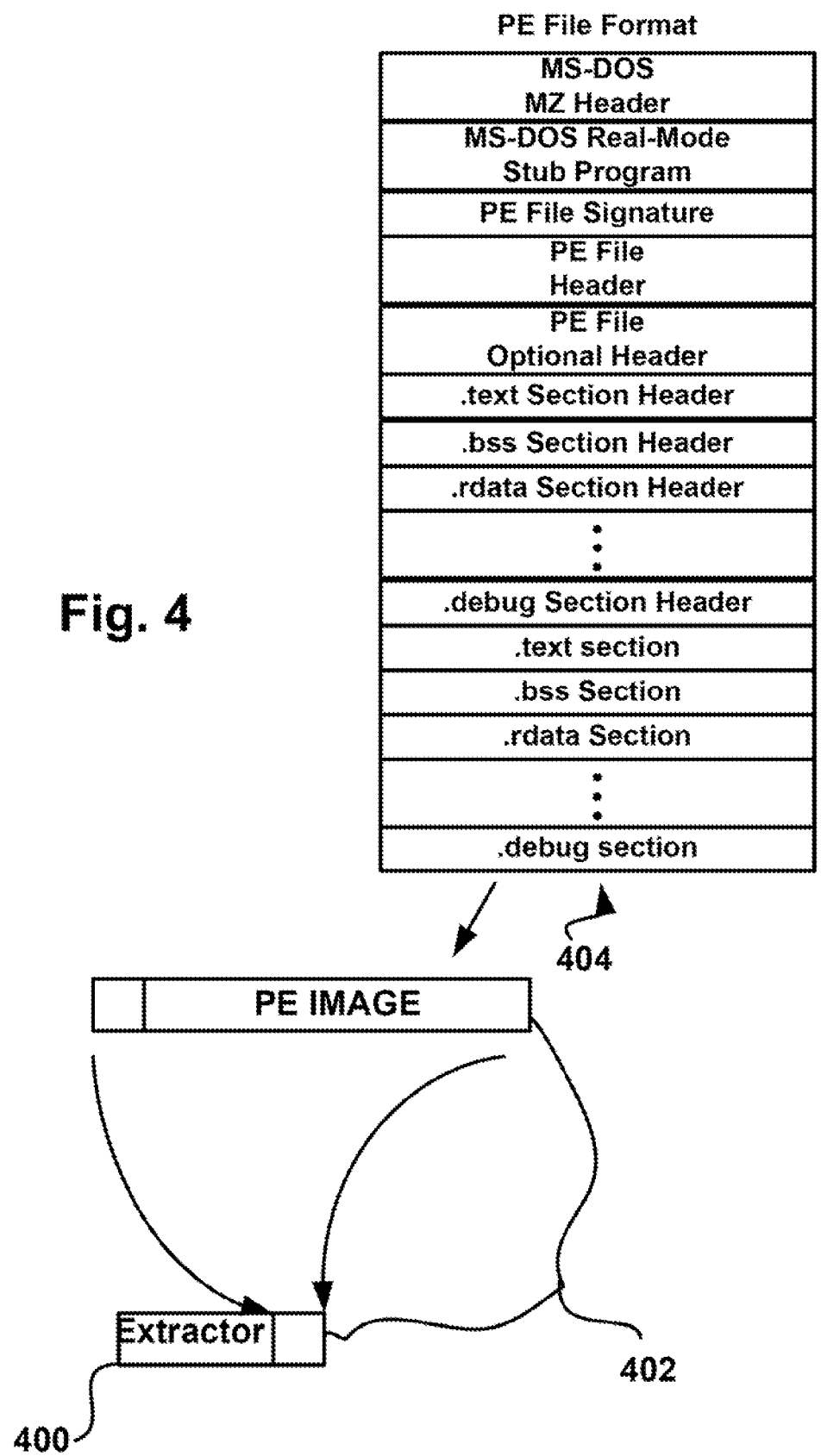
FIG. 4 illustrates extractor code and a portable executable (PE) image that may be employed in the context of one embodiment.

FIG. 4 illustrates extractor code 400 and a portable executable (PE) image 402 that may be employed in the context of one embodiment. In particular, the aforementioned wrappers 322 of FIG. 3 may be adapted for compressing data in the form of a portable executable (PE) image 402. Note the format 404 of one exemplary standard PE image 402 shown in FIG. 4.

Further, the wrapper 322 may equip the compressed data with extractor code 400 adapted for extracting the data in the PE image. Such extractor code 400 may further be adapted for interfacing with the second API 320'. In particular, the extractor code 400 may be used to extract the PE image for use in accessing the appropriate locations in memory.

Figure 5:
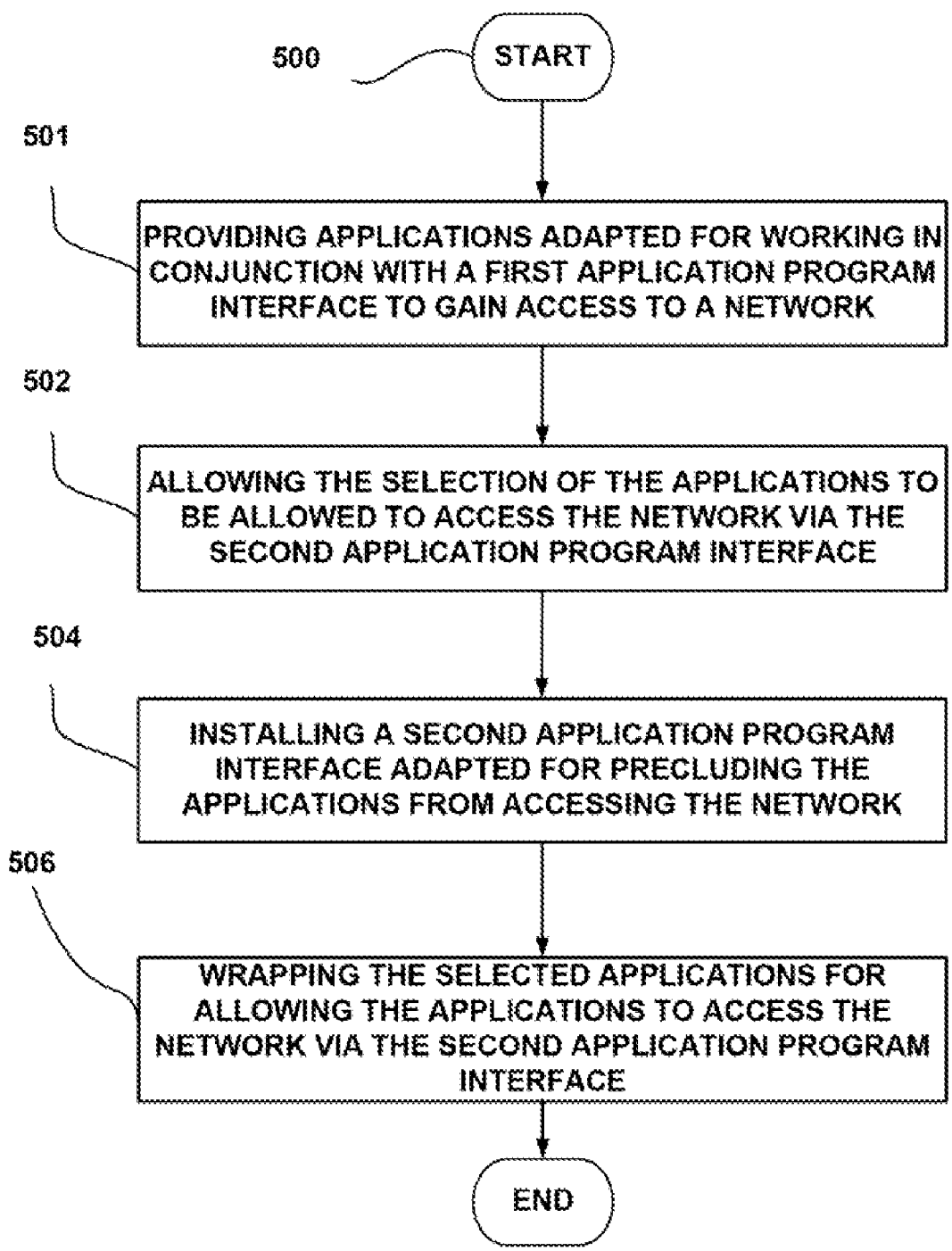
FIG. 5 is a flowchart of a method for management of network access on a per application basis, in accordance with one embodiment.

FIG. 5 is a flowchart of a method 500 for management of network access on a per application basis, in accordance with one embodiment. As an option, the present method 500 may be carried out in the context of the architecture of FIGS. 1 through 3. Of course, however, the present method 500 may be executed in any desired context and environment.

Initially, a plurality of applications is provided which are adapted for working conjunction with a first API to gain access to a network. See operation 501. As mentioned earlier, standard computers are equipped with a first API that is equipped to operate in this manner.

Next, in operation 502, the selection of certain applications is permitted. Again, these applications may be selected in any desired manner such as via a user, an administrator, automatically, or in any other desired manner. As mentioned earlier, such selected applications are originally adapted for working only in conjunction with a first API to gain access to a network.

In operation 504, a second API is installed which is adapted for precluding the applications from accessing the network.

Further, the selected applications are wrapped for allowing the selected applications to access the network via the second API. See operation 506.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method, comprising:
   selecting applications from a group of applications adapted for working in conjunction with a first application program interface to gain access to a network;
   installing a second application program interface adapted for precluding the applications from accessing the network utilizing a processor; and
   wrapping the selected applications for allowing the selected applications to access the network via the second application program interface;
   wherein the selected applications are wrapped with a wrapper adapted for compressing data in a portable executable (PE) image that provides compression of data associated with the selected applications;
   wherein the wrapper equips the compressed data with extractor code adapted for extracting the data in the PE image;
   wherein the extractor code is further adapted for interfacing with the second application program interface.

2. The method as recited in claim 1, wherein the wrapper is further adapted for identifying a location in memory.

3. The method as recited in claim 2, wherein the location in memory is where a routine is stored for allowing the selected applications to access the network.

4. The method as recited in claim 1, and further comprising allowing a user to select the applications to be allowed to access the network via the second application program interface.

5. The method as recited in claim 1, wherein the second application program interface is separate from the first application program interface.

6. A computer program product embodied on a tangible computer readable memory, comprising:
   computer code for selecting applications from a group of applications adapted for working in conjunction with a first application program interface to gain access to a network;
   computer code for installing a second application program interface adapted for precluding the applications from accessing the network; and
   computer code for wrapping the selected applications for allowing the selected applications to access the network via the second application program interface;
   wherein the computer program product is operable such that the selected applications are wrapped with a wrapper adapted for compressing data in a portable executable (PE) image that provides compression of data associated with the selected applications;
   wherein the computer program product is operable such that the wrapper equips the compressed data with extractor code adapted for extracting the data in the PE image;
   wherein the computer program product is operable such that the extractor code is further adapted for interfacing with the second application program interface.

7. The computer program product as recited in claim 6, wherein the wrapper is further adapted for identifying a location in memory.

8. The computer program product as recited in claim 7, wherein the location in memory is where a routine is stored for allowing the selected applications to access the network.

9. The computer program product as recited in claim 6, and further comprising computer code for allowing a user to select the applications to be allowed to access the network via the second application program interface.

10. A method, comprising:
   installing an application program interface adapted for precluding a plurality of applications from accessing a network, utilizing a processor; and
   wrapping a plurality of selected applications for allowing the selected applications to access the network via the application program interface;
   wherein the selected applications are wrapped with a wrapper adapted for compressing data in a portable executable (PE) image that provides compression of data associated with the selected applications;
   wherein the wrapper equips the compressed data with extractor code adapted for extracting the data in the PE image;
   wherein the extractor code is further adapted for interfacing with the application program interface;
   wherein the wrapper is adapted for identifying a location in memory;
   wherein a user is allowed to select the applications to be allowed to access the network via the application program interface.

* * * * *